(12) United States Patent
Benisty et al.

(10) Patent No.: US 11,734,207 B1
(45) Date of Patent: Aug. 22, 2023

(54) DYNAMIC PORT ALLOCATION IN PCIE BIFURCATION SYSTEM

(71) Applicant: Western Digital Technologies, Inc., San Jose, CA (US)

(72) Inventors: Shay Benisty, Beer Sheva (IL); Judah Gamliel Hahn, Ofra (IL); Avichay Haim Hodes, Kfar Ben-Nun (IL)

(73) Assignee: Western Digital Technologies, Inc., San Jose, CA (US)

( * ) Notice: Subject to any disclaimer, the term of this patent is extended or adjusted under 35 U.S.C. 154(b) by 11 days.

(21) Appl. No.: 17/649,703

(22) Filed: Feb. 2, 2022

(51) Int. Cl.
*G06F 13/10* (2006.01)
*G06F 13/16* (2006.01)

(52) U.S. Cl.
CPC ............................... *G06F 13/1668* (2013.01)

(58) Field of Classification Search
CPC .......... G06F 13/1668; G06F 3/00; G06F 7/00; G06F 9/00; G06F 13/00
See application file for complete search history.

(56) References Cited

U.S. PATENT DOCUMENTS

| | | | |
|---|---|---|---|
| 8,462,628 B2* | 6/2013 | Wynne | H04L 49/30 370/235 |
| 8,850,128 B2 | 9/2014 | Chu et al. | |
| 9,424,315 B2* | 8/2016 | Chamdani | G06F 16/2455 |
| 10,002,093 B1* | 6/2018 | Phong | G06F 13/28 |
| 10,082,957 B2 | 9/2018 | Herman et al. | |
| 10,394,747 B1* | 8/2019 | Paneah | G06F 13/4282 |
| 10,725,835 B2 | 7/2020 | Benisty | |
| 10,929,320 B1* | 2/2021 | Chou | G06F 13/20 |
| 11,023,144 B2* | 6/2021 | Ahmed Sheriff | G06F 3/0664 |
| 11,042,300 B2 | 6/2021 | Olcay et al. | |
| 2012/0260015 A1* | 10/2012 | Gay | G06F 13/409 710/301 |
| 2014/0258598 A1 | 9/2014 | Canepa et al. | |
| 2017/0147056 A1 | 5/2017 | Woo et al. | |
| 2017/0171106 A1 | 6/2017 | Woo et al. | |
| 2017/0344506 A1 | 11/2017 | Park et al. | |
| 2020/0081858 A1* | 3/2020 | Philmore | G06F 13/4027 |

(Continued)

FOREIGN PATENT DOCUMENTS

| | | |
|---|---|---|
| CN | 110377221 A | 10/2019 |
| KR | 20190056951 A | 5/2019 |

OTHER PUBLICATIONS

International Search Report and Written Opinion for International Application No. PCT/US2022/030413 dated Oct. 26, 2022.

*Primary Examiner* — Cheng Yuan Tseng
(74) *Attorney, Agent, or Firm* — Patterson + Sheridan, LLP; Steven H. VerSteeg

(57) ABSTRACT

The present disclosure generally relates to utilizing a port scheduler within a data storage device controller to schedule data transfers and determine which port should be utilized for each data packet transferred. The data storage device comprises a multi-port system on a host interface. The port scheduler can consider the following factors for example: link workload, idle time for each port, link power state, throughput for each port, speed of each link, priority of data transfer, and quality of service (QoS). Based upon an analysis of one or more of the factors, the port scheduler can transfer data on a port that is not associated with the data to ensure efficient multi-port usage.

20 Claims, 6 Drawing Sheets

(56) References Cited

U.S. PATENT DOCUMENTS

2021/0232520 A1* 7/2021 Choudhary ......... G06F 13/4068
2021/0248102 A1* 8/2021 Cheng ................. G06F 13/4282
2022/0027165 A1* 1/2022 Juan ..................... G06F 21/572

* cited by examiner

DYNAMIC PORT ALLOCATION IN PCIE BIFURCATION SYSTEM

BACKGROUND OF THE DISCLOSURE

Field of the Disclosure

Embodiments of the present disclosure generally relate to efficient dual port usage in a nonvolatile memory (NVM) express (NVMe) system.

Description of the Related Art

Enterprise solid state devices (SSDs) support NVMe dual port features as defined in the NVMe standard and the peripheral component interconnect express (PCIe) standard. Traditionally, single x4 devices are split into two x2 devices via port A and port B. The methods to access the device are either port A as a single port, port B as a single port, or both ports simultaneously as a dual port system. The dual ports provide the ability to connect two host devices simultaneously to a data storage device.

The data storage device can be connected directly to a host device central processing unit (CPU) or via PCIe switch topology if a higher SSD count is necessary. The concept is the same as SAS Enterprise Storage HA designs, but implemented with a PCIe bus.

Dual port NVMe extensions were added to the original specification with NVMe 1.1 revision. The eco-system is new and very focused on addressing specific problems. The problems are common for Enterprise Storage (Scale Up Storage) and some other areas such as HPC storage.

For PCIe, such a feature is called PCIe bifurcation which means dividing the PCIe slot into smaller chunks/branches. For example, a PCIe x8 card slot could be bifurcated into two x4 chunks or a PCIe x16 into four x4 (i.e., x4x4x4x4) or two x8 (i.e., x8x8), or one x8 and two x4 (i.e., x8x4x4/x4x4x8). The PCIe bifurcation does not decrease speed, but rather, only splits/bifurcates lanes. In order to use bifurcation, the motherboard should support bifurcation, and then BIOS should support bifurcation as well.

Previously, data was transferred on each link as determined by previously queued commands in that link by the host device. The data associated with a command that was previously in one port would never transfer to any other port, which results in a loss in performance when only one port is fully utilized while the other port can sustain more bandwidth. Scheduling data transfers over the links in a dual port system is challenging when considering several parameters such as link states, link workload, and throughput.

Therefore, there is a need in the art for a dual port scheduling data transfers over a bifurcated link.

SUMMARY OF THE DISCLOSURE

The present disclosure generally relates to utilizing a port scheduler within a data storage device controller to schedule data transfers and determine which port should be utilized for each data packet transferred. The data storage device comprises a multi-port system on a host interface. The port scheduler can consider the following factors for example: link workload, idle time for each port, link power state, throughput for each port, speed of each link, priority of data transfer, and quality of service (QoS). Based upon an analysis of one or more of the factors, the port scheduler can transfer data on a port that is not associated with the data to ensure efficient multi-port usage.

In one embodiment, a data storage device comprises: a memory device; and a controller coupled to the memory device, wherein the controller is a multi-port system on a host interface configured to: determine that a mixture of data transfer over a plurality of ports is allowed; monitor links of the plurality of ports; select a port of the plurality of ports for a next transfer of data; and transfer data over the port.

In another embodiment, a data storage device comprises: a memory device; and a controller coupled to the memory device, wherein the controller is a multi-port system on a host interface and comprises: a host interface module (HIM), wherein the HIM comprises a port scheduler configured to determine over which port of a plurality of ports data will transfer; a flash interface module (FIM); an encoder/decoder; an encryption/decryption module; and a command scheduler.

In another embodiment, a data storage device comprises: memory means; and a controller coupled to the memory means, wherein the controller is a multi-port system on a host interface configured to: receive a command from a host device on a first port; monitor activity on the first port and a second port; and return data associated with the command to the host device on the second port.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to utilizing a port scheduler within a data storage device controller to schedule data transfers and determine which port should be utilized for each data packet transferred. The data storage device comprises a multi-port system on a host interface. The port scheduler can consider the following factors for example: link workload, idle time for each port, link power state, throughput for each port, speed of each link, priority of data transfer, and quality of service (QoS). Based upon an analysis of one or more of the factors, the port scheduler can transfer data on a port that is not associated with the data to ensure efficient multi-port usage.

Figure 1:
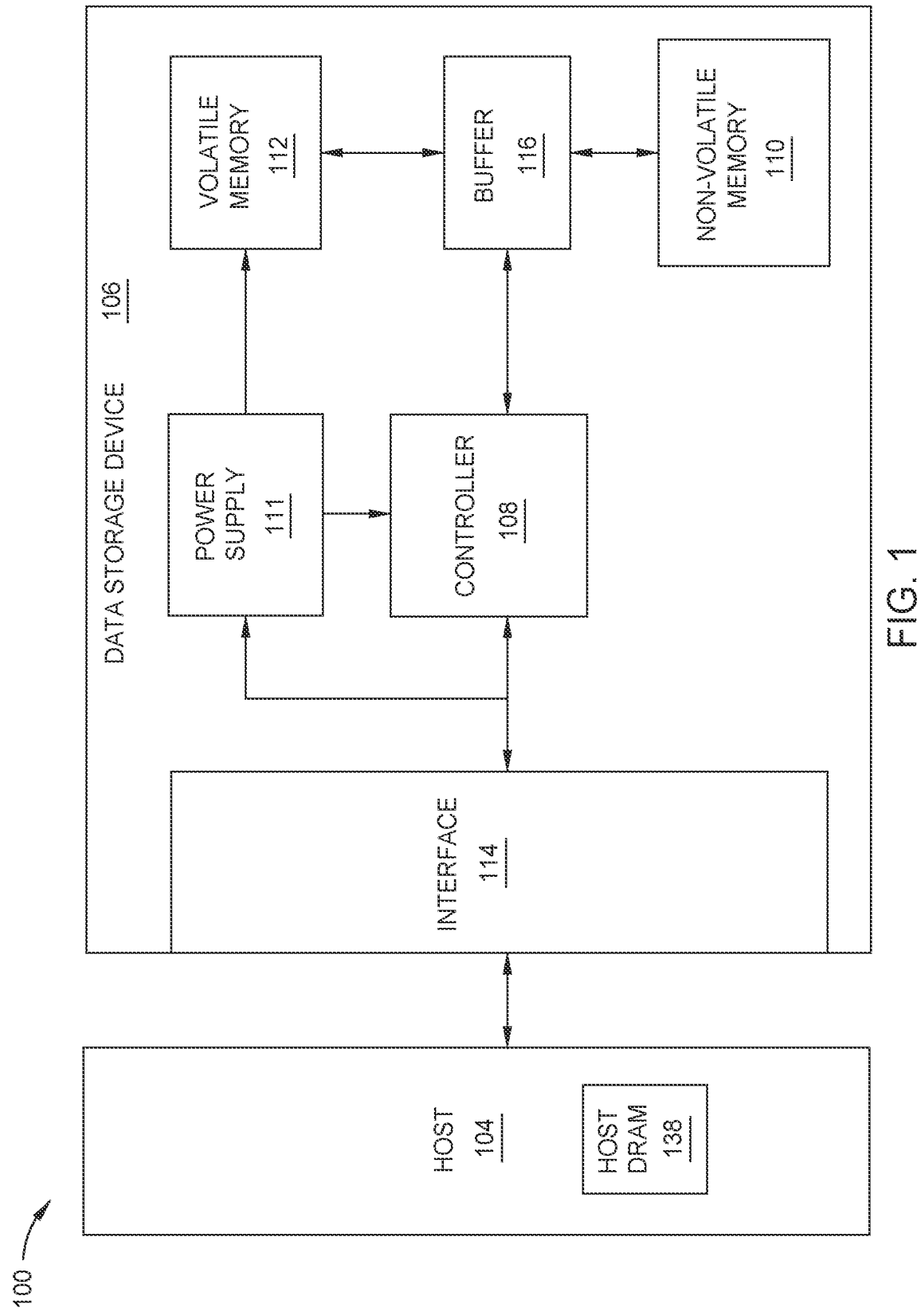
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
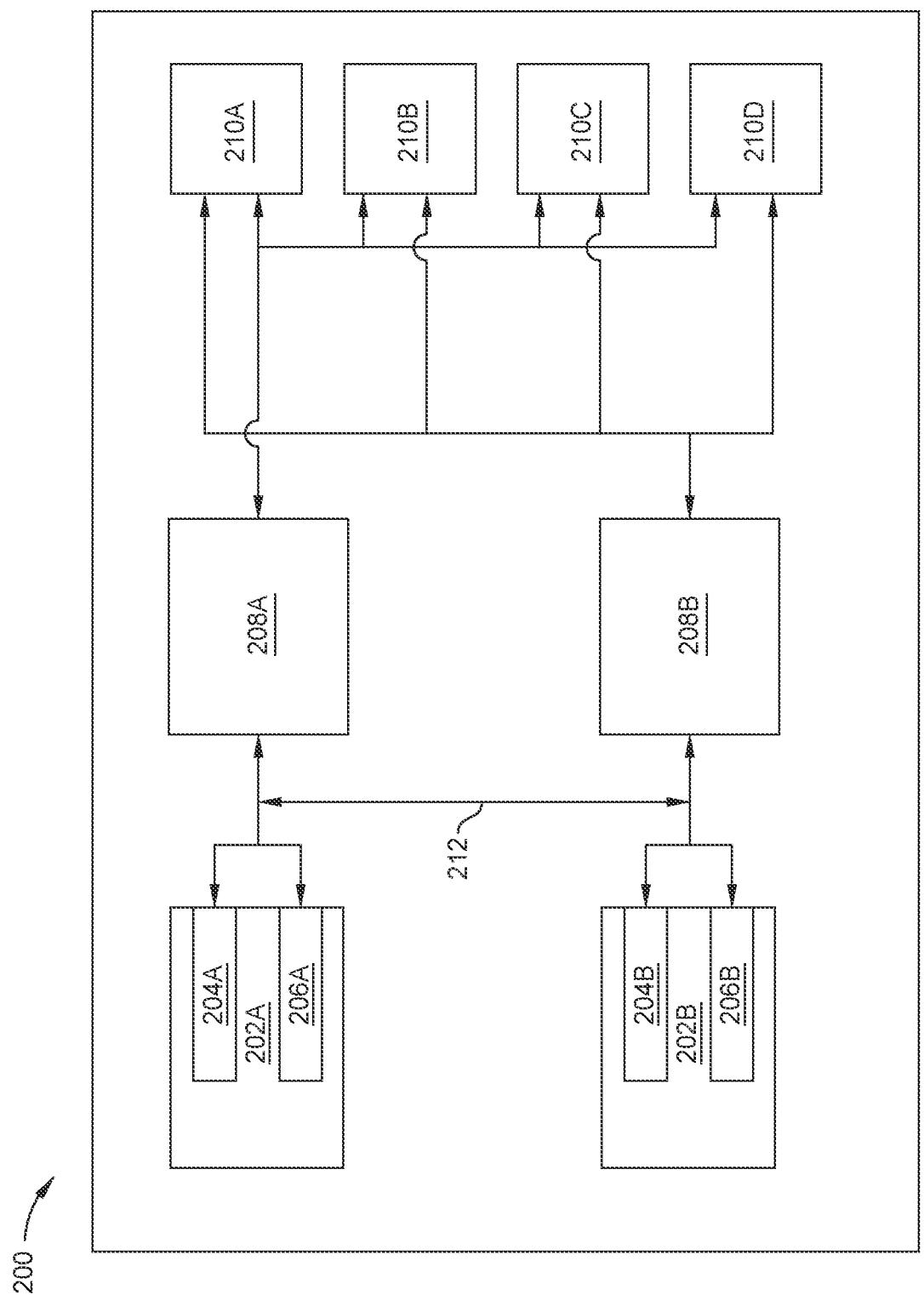
FIG. 2 is a schematic illustration of a dual port storage controller system.

FIG. 2 is a schematic illustration of a dual port storage controller system 200. The system 200 includes two servers 202A, 202B, with each server 202A, 202B having a first host bus adapter (HBA) 204A, 204B and a second HBA 206A, 206B. The system 200 also includes two switches 208A, 208B as well as a plurality of data storage devices 210A-210D. Each data storage device 210A-210D is connected to both switches 208A, 208B. One switch 208A is connected to both the first HBA 204A and the second HBA 206A of the first server 202A. A second switch 208B is connected to both the first HBA 204B and the second HBA 206B of the second server 202B. Furthermore, the connection between the first switch 208A and the second HBA 206A of the first server 202A is connected to the connection between the second switch 208A and the first HBA 204B of the second server 202B as shown by line 212. In the system 200, each data storage device 210A-210D has two ports such that the data storage devices 210A-210D are coupled to two distinct switches 208A, 208B, where the switches 208A, 208B and servers 202A, 202B collectively represent a host device. The system 200 illustrates that two hosts, can be connected to a single data storage device. Furthermore, system 200 illustrates that an individual host device can share at least one, and in some cases multiple, data storage device(s) with at least one other host device.

As will be discussed below, a port scheduler can be incorporated into the data storage device controller to schedule data transfers over the links in a dual port system. The port scheduler schedules the data transfers and decided upon which port each data packed will be transferred. The data transfers may be done in any granularity (e.g., PCIe TLP, 4KB, or per command). The bifurcation is allowed by the host device at the initialization phase for shared data, such as host memory buffer (HMB) and for user data. The host signaling ensures that the bifurcation feature is allowed in the system due to host device specific security or address translation requirements (e.g., address translations do not collide and are consistent between ports). Load balancing between ports for the data that is shared by both ports is possible due to the port scheduler. One example for load balancing is data transfer to the HMB, if used. Traffic balancing between ports for user data is also beneficial due to the port scheduler. The user data associated with a command queued in one port (or part of the data) might be transferred on the other port due to bandwidth, power, and QoS.

Figure 3:
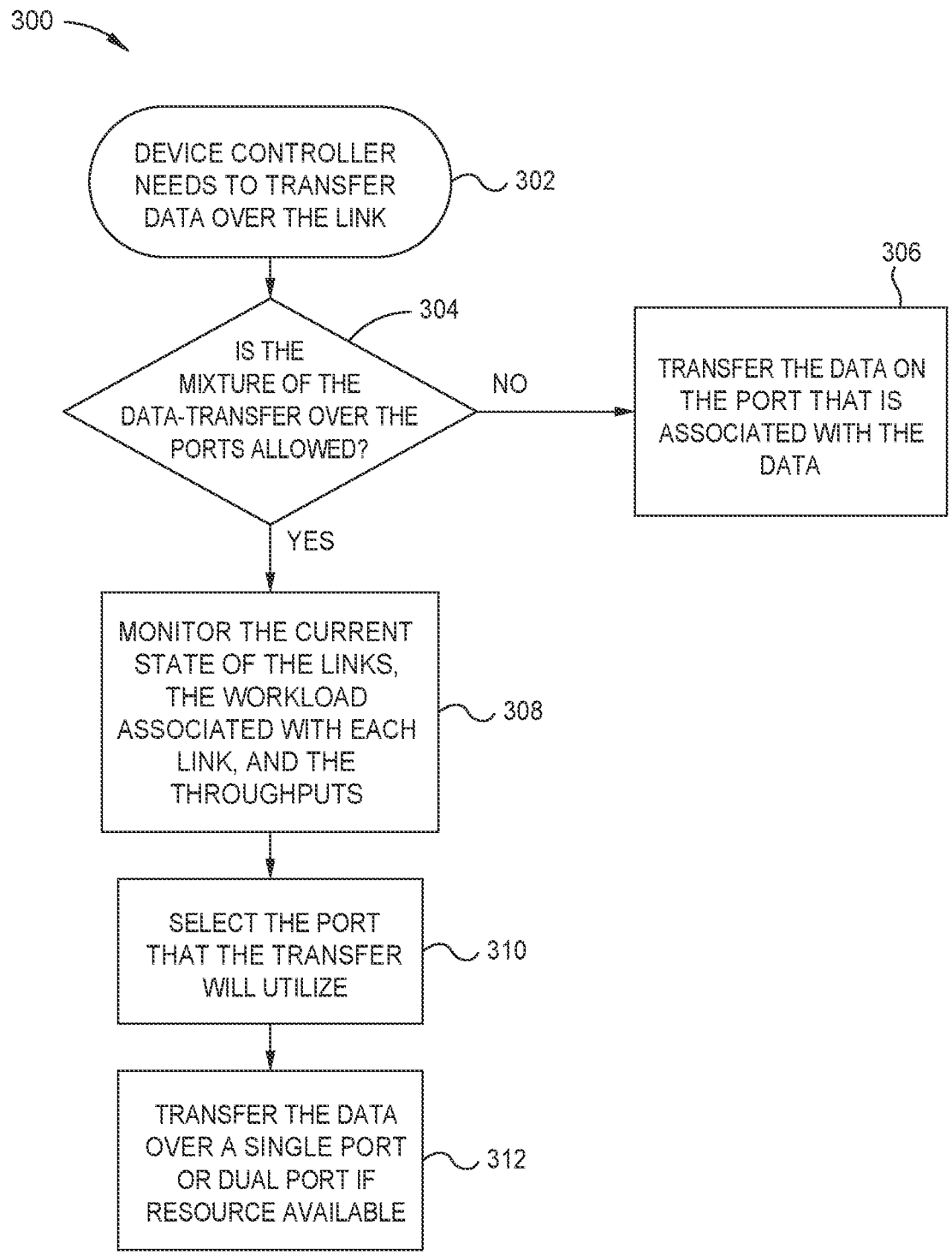
FIG. 3 is a flowchart illustrating dual port data transfer management according to one embodiment.

FIG. 3 is a flowchart 300 illustrating dual port data transfer management according to one embodiment. The method starts when the data storage device needs to transfer data over the link between the data storage device and the host device at 302. The scheduling may work per command, per 4KB, or per PCIe packet. A determination is made regarding whether the mixture of data transfer over the ports is allowed at 304. When the mixture is not allowed by the host at 304, the data will be transferred over the native link (i.e., the host that triggered the data transfer) at 306. If the mixture is allowed at 304, the data storage device controller monitors the current state of the links, the workload associated with each link, and the throughputs at 308. Based upon the monitoring, a port that will transfer the data is selected by the controller at 310. Finally, the data is transferred on the selected link at 312. In one embodiment, the data storage device controller may decided to transfer the chunk of data over the two links in parallel to increase the performance.

Figure 4:
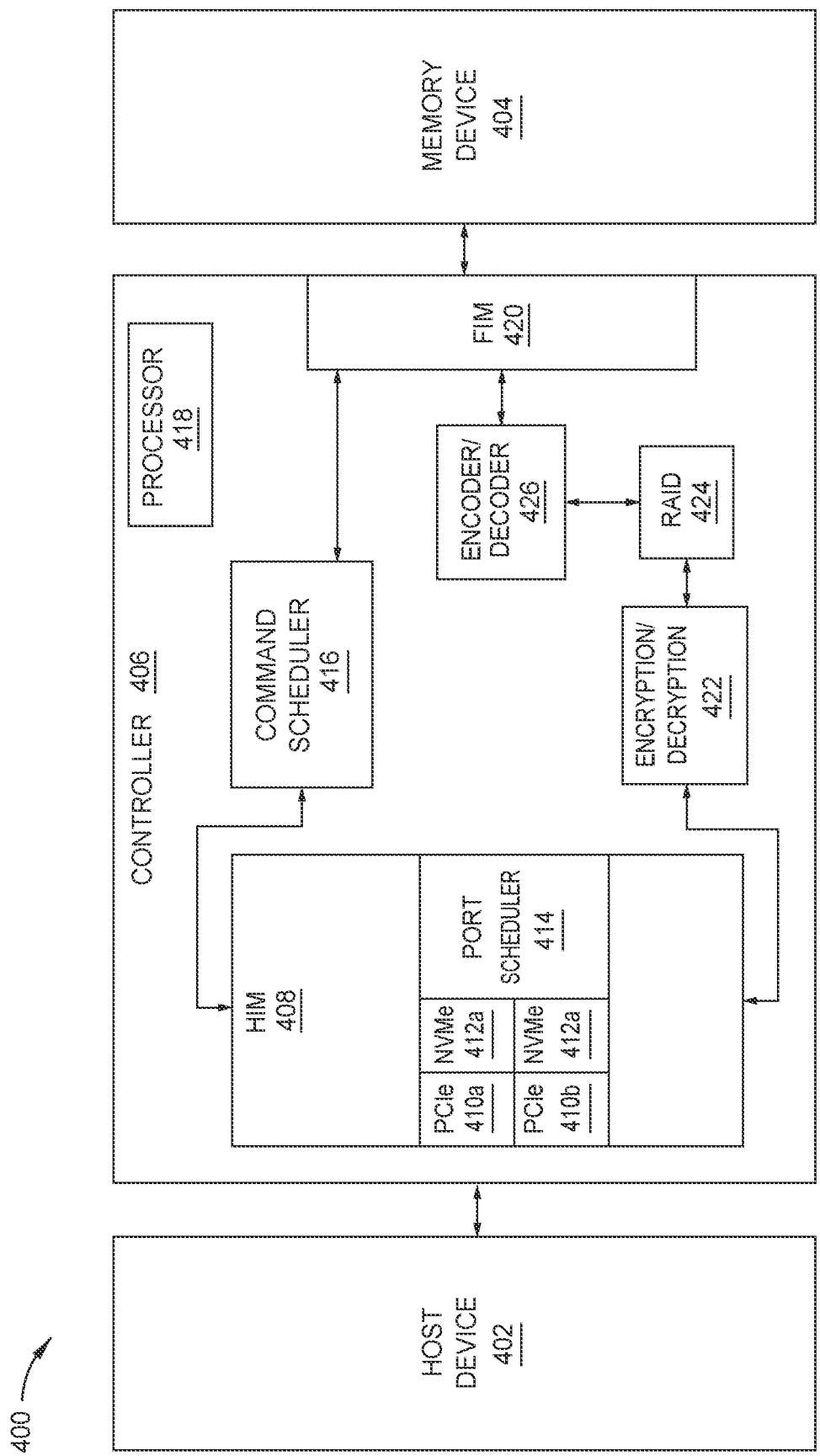
FIG. 4 is a schematic illustration of a system having dual port data transfer management according to one embodiment.

FIG. 4 is a schematic illustration of a system 400 having dual port data transfer management according to one embodiment. The system 400 includes a host device 402, a memory device 404, and a controller 406 coupled to both the memory device 404 and the host device 402. The controller 406 includes a host interface module (HIM) 408 that implements the dual port feature (i.e., PCIe endpoints or ports 410A, 410B) while having two NVMe logics 412A, 412B. A port scheduler 414 is also implemented into the HIM 408. The port scheduler 414 is responsible for getting the DMA requests and forwards the DMA requests to the appropriate port 410A, 410B based upon the parameters detailed below.

The controller 406 also includes one or more processors 418 as well as a command scheduler 416 that is coupled between the HIM 408 and the flash interface module (FIM) 420. An encoder/decoder module 426, a RAID 424, and an encryption/decryption module 422 are also present. The encryption/decryption module 422 is coupled between the HIM 408 and the RAID 424. The RAID 424 is coupled between the encryption/decryption module 422 and the encoder/decoder module 426. The encoder/decoder module 426 is coupled between the RAID 424 and the FIM 420.

In one embodiment, the host device 402 may enable the dual port bifurcation for shared data and user data separately, which will permit, for example, transferring HMB data over any link but user data only on the link that triggered the request. In another embodiment, the data storage device controller 406 may enable/disable the dual port bifurcation feature dynamically. The enabling/disabling may occur, for example, when the bifurcation causes an error rate increase that is detected. If the error rate increase is detected, the bifurcation can be automatically disabled. The error rate detection may be based upon exceeding a predetermined threshold. Alternatively, the bifurcation may only be enabled for specific operations such as sequential read operations. In an additional embodiment, token based management may be implemented in which each host device can post a token to indicate that the host is active and bifurcation cannot be permitted while removal of the token indicates that the host permits use of the dedicated resources/port. In another embodiment, the system may include more PCIe ports than the two ports identified herein.

Figure 5:
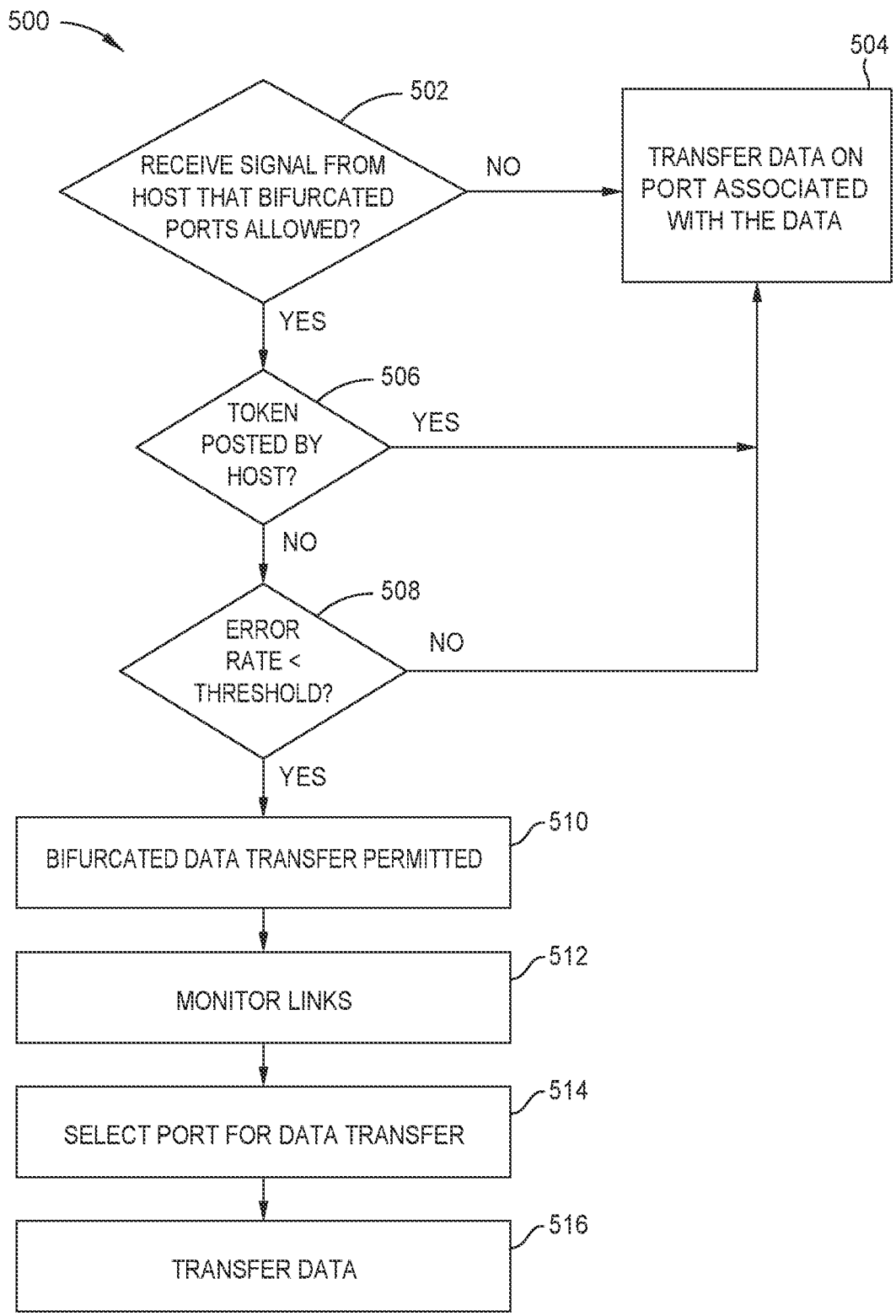
FIG. 5 is a flowchart illustrating dual port data transfer management according to one embodiment.

FIG. 5 is a flowchart 500 illustrating dual port data transfer management according to one embodiment. Initially, a determination is made regarding whether a signal has been received from a host that bifurcated ports are allowed at 502. If bifurcated ports are not allowed at 502, then the data is transferred on the port associated with the data at 504. Thereafter, a determination is made regarding whether a token has been posted by the host at 506. If a token has been posted, then the data is transferred on the port associated with the data at 504. If no token is posted at 506, then a determination is made regarding whether a detected error rate has exceeded a threshold at 508. If the error rate has exceeded a threshold (i.e., bifurcated ports has led to an error increase), then the data is transferred on the port associated with the data at 504. However, if the error rate has not exceeded a threshold at 508, then bifurcated data transfer is permitted at 510. The controller, and more specifically the port scheduler, then monitors the lines at 512, selects a port for data transfer at 514, and transfers data on the selected port at 516. It is to be understood that blocks 502, 506, 508 may be performed simultaneously or in any order.

Figure 6:
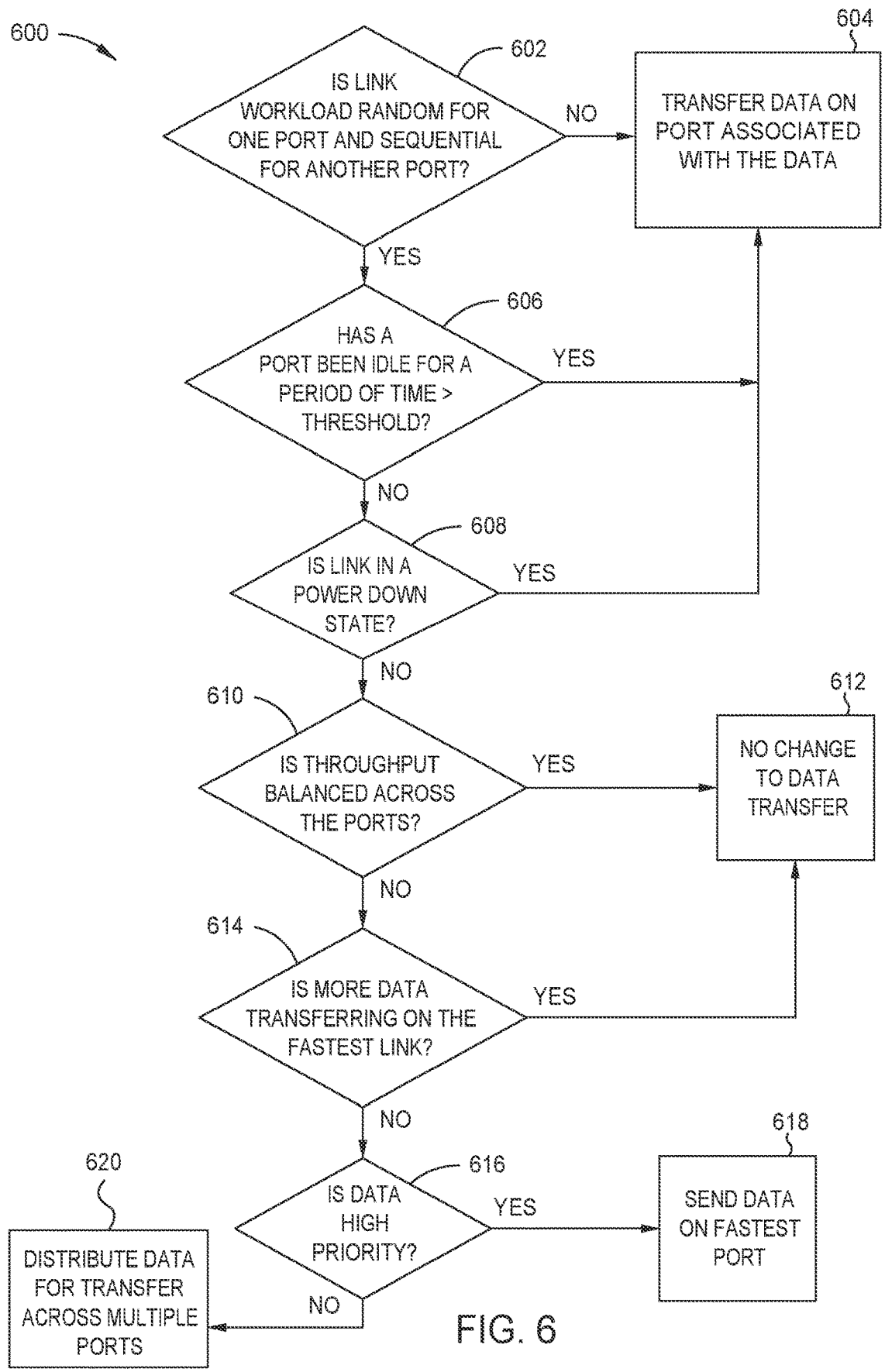
FIG. 6 is a flowchart illustrating dual port data transfer monitoring according to one embodiment.

FIG. 6 is a flowchart 600 illustrating dual port data transfer monitoring according to one embodiment. The device controller considers numerous parameters before making the decision on which port the data will be transferred in a bifurcated dual port system. One such parameter is the link workload. The controller determines whether the link workload is random for one port while sequential for another port, for example, at 602. If the answer is 'no' at 602, then the data is transferred on the port associated with the data at 604. If the workload associated with a first link is sequential data when the performance is limited by the link and the random workload on a second port while the performance is not limited by the second link, it makes sense to transfer part of the sequential data over the second link in order to maximize the overall performance.

Another parameter that is monitored is the idle time of the port. A determination is made at 606 regarding whether the port has been idle for a period of time that is greater than a predetermined threshold. If the idle time exceeds the predetermined threshold, then the data is transferred on the other port associated with the data at 604. If one port is in an idle state for a long time and will soon be in a sleep state, it might be beneficial to transfer the data over the other link.

Another parameter that is monitored is the link power state. If the link is in a power down state at 608, then the data is transferred on the part associated with the data at 604. If a first link is in the sleep state, there is a transfer associated with the first link. If the second link is not fully saturated, then the data storage device may decide to transfer the data associated with the first link on the second link.

Other parameters that are monitored include the current throughput for each port, the link speed/gen of each link, and the priority and QoS requirements of the current data transfer. For example, for a high priority packet, the logic will pick the port that transfers the high priority packet fastest. As shown in FIG. 6, a determination is made regarding whether the data throughput is balanced across the ports at 610. If the data is balanced, then there is no need to change the data transfer at 612. If there is more data transferring on the fastest link compared to the slower link at 614, then again, there is no need to change the data transfer at 612. If there is high priority data at 616, then the data should be sent on the fastest port at 618, but if there is no high priority data, then the data should be distributed across the multiple ports at 620.

It is to be understood that the parameters need not be considered in the order presented in FIG. 6. Rather, the parameters can be considered in any order or even simultaneously. Furthermore, it is contemplated that any one individual parameter may control whether bifurcated dual port usage may occur. For example, while one or more parameters may suggest that bifurcated dual port usage may occur, any one individual parameter may trump bifurcated dual port usage if such parameter indicates that bifurcated dual port usage would not be beneficial.

In any event, if the host device permits, and the parameters line up correctly to indicate that bifurcated dual port usage is beneficial, the data storage device controller, and more specifically the port scheduler disposed in the HIM, can return data to the host device over a port that is different from the port over which the data request passed. The parameters can change at any time as the data storage device operates, and therefore the bifurcated dual port usage may be used sometimes, yet not used other times. Furthermore, the host device may rescind permission at any point in time due to any number of factors. Thus, port allocation in a PCIe bifurcation system is dynamic.

By scheduling data transfer over a dual port bifurcated link, QoS and power can be measured to ensure each port is fully utilized by the host device. Rather than utilizing one port fully with the other port not fully utilized, one port can take advantage of the bifurcated implementation of the other port for bandwidth and QoS increase. The dual port bifurcation utilization cane be performed dynamically so that the QoS and performance of the other port is not influenced.

In one embodiment, a data storage device comprises: a memory device; and a controller coupled to the memory device, wherein the controller is a multi-port system on a host interface configured to: determine that a mixture of data transfer over a plurality of ports is allowed; monitor links of the plurality of ports; select a port of the plurality of ports for a next transfer of data; and transfer data over the port. Monitoring the links comprises monitoring a current state of each links. Monitoring the links comprises monitoring a workload associated with each link. Monitoring the links comprises monitoring throughput associated with each link. The controller is configured to receive a signal from a host device that data transfer bifurcation is permitted. The controller is further configured to perform load balancing between the ports for data that is shared by the ports. The controller is configured to deliver user data over a specific port and host memory buffer data over any port. The controller is further configured to dynamically enable or disable transferring data over a port not originally associated with the data. The dynamically enable or disable transferring data is in response to a detected error rate exceeding a predetermined threshold. The controller is further configured to determine that a host device as removed a token indicating that it is ok to utilize a dedicated port of the host device.

In another embodiment, a data storage device comprises: a memory device; and a controller coupled to the memory device, wherein the controller is a multi-port system on a host interface and comprises: a host interface module (HIM), wherein the HIM comprises a port scheduler configured to determine over which port of a plurality of ports data will transfer; a flash interface module (FIM); an encoder/decoder; an encryption/decryption module; and a command scheduler. The scheduler is configured to transfer data intended for a host memory buffer over the plurality of ports. The scheduler is configured to transfer user data over the port associated with the data. The scheduler is configured to load balance data transfer over the plurality of ports. The scheduler is configured to transfer data associated with a command queued in one port to a different port. The scheduler is configured to transfer the data based upon port bandwidth, power, and quality of service (QoS).

In another embodiment, a data storage device comprises: memory means; and a controller coupled to the memory means, wherein the controller is a multi-port system on a host interface configured to: receive a command from a host device on a first port; monitor activity on the first port and a second port; and return data associated with the command to the host device on the second port. The monitoring comprises monitoring one or more of the following: link workload, port idle time, link power state, port throughput, link speed, priority of current transfer, and quality of service (QoS). The controller is configured to detect an error rate increase when returning the data. The controller is configured to return the data on the first port in response to detecting the error rate increase.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is a multi-port system on a host interface configured to:
   determine that a mixture of data transfer over a plurality of ports is allowed, wherein the data is associated with a first port;
   monitor links of the plurality of ports;
   select a second port of the plurality of ports for a next transfer of the data, wherein the second port is not associated with the data; and
   transfer the data over the second port.

2. The data storage device of claim 1, wherein monitoring the links comprises monitoring a current state of each links.

3. The data storage device of claim 1, wherein monitoring the links comprises monitoring a workload associated with each link.

4. The data storage device of claim 1, wherein monitoring the links comprises monitoring throughput associated with each link.

5. The data storage device of claim 1, wherein the controller is configured to receive a signal from a host device that data transfer bifurcation is permitted.

6. A data storage device, comprising:
a memory device; and
a controller coupled to the memory device, wherein the controller is a multi-port system on a host interface configured to:
   determine that a mixture of data transfer over a plurality of ports is allowed;
   monitor links of the plurality of ports;
   select a port of the plurality of ports for a next transfer of data; and
   transfer data over the port, wherein the controller is further configured to perform load balancing between the ports for data that is shared by the ports.

7. A data storage device, comprising:
a memory device; and
a controller coupled to the memory device, wherein the controller is a multi-port system on a host interface configured to:
   determine that a mixture of data transfer over a plurality of ports is allowed;
   monitor links of the plurality of ports;
   select a port of the plurality of ports for a next transfer of data; and
   transfer data over the port, wherein the controller is configured to deliver user data over a specific port and host memory buffer data over any port.

8. A data storage device, comprising:
a memory device; and
a controller coupled to the memory device, wherein the controller is a multi-port system on a host interface configured to:
   determine that a mixture of data transfer over a plurality of ports is allowed;
   monitor links of the plurality of ports;
   select a port of the plurality of ports for a next transfer of data; and
   transfer data over the port, wherein the controller is further configured to dynamically enable or disable transferring data over a port not originally associated with the data.

9. The data storage device of claim 8, wherein the dynamically enable or disable transferring data is in response to a detected error rate exceeding a predetermined threshold.

10. The data storage device of claim 1, wherein the controller is further configured to determine that a host device has removed a token indicating that it is ok to utilize a dedicated port of the host device.

11. A data storage device, comprising:
a memory device; and
a controller coupled to the memory device, wherein the controller is a multi-port system on a host interface and comprises:
   a host interface module (HIM), wherein the HIM comprises a port scheduler configured to determine over which port of a plurality of ports data will transfer, wherein the port scheduler can transfer the data on a port of the plurality of ports that is not associated with the data;
   a flash interface module (FIM);
   an encoder/decoder;

an encryption/decryption module; and a command scheduler.

12. The data storage device of claim 11, wherein the scheduler is configured to transfer data intended for a host memory buffer over the plurality of ports.

13. The data storage device of claim 12, wherein the scheduler is configured to transfer user data over the port associated with the data.

14. A data storage device, comprising:

a memory device; and a controller coupled to the memory device, wherein the controller is a multi-port system on a host interface and comprises:

- a host interface module (HIM), wherein the HIM comprises a port scheduler configured to determine over which port of a plurality of ports data will transfer;
- a flash interface module (FIM);
- an encoder/decoder;
- an encryption/decryption module; and
- a command scheduler, wherein the scheduler is configured to load balance data transfer over the plurality of ports.

15. A data storage device, comprising:

a memory device; and a controller coupled to the memory device, wherein the controller is a multi-port system on a host interface and comprises:

- a host interface module (HIM), wherein the HIM comprises a port scheduler configured to determine over which port of a plurality of ports data will transfer;
- a flash interface module (FIM);
- an encoder/decoder;
- an encryption/decryption module; and
- a command scheduler, wherein the scheduler is configured to transfer data associated with a command queued in one port to a different port.

16. The data storage device of claim 15, wherein the scheduler is configured to transfer the data based upon port bandwidth, power, and quality of service (QoS).

17. A data storage device, comprising:

memory means; and a controller coupled to the memory means, wherein the controller is a multi-port system on a host interface configured to:

receive a command from a host device on a first port;

monitor activity on the first port and a second port; and return data associated with the command to the host device on the second port, wherein the returned data is not associated with the second port.

18. A data storage device, comprising:

memory means; and a controller coupled to the memory means, wherein the controller is a multi-port system on a host interface configured to:

receive a command from a host device on a first port;

monitor activity on the first port and a second port; and return data associated with the command to the host device on the second port, wherein the monitoring comprises monitoring one or more of the following: link workload, port idle time, link power state, port throughput, link speed, priority of current transfer, and quality of service (QoS).

19. A data storage device, comprising:

memory means; and a controller coupled to the memory means, wherein the controller is a multi-port system on a host interface configured to:

receive a command from a host device on a first port;

monitor activity on the first port and a second port; and return data associated with the command to the host device on the second port, wherein the controller is configured to detect an error rate increase when returning the data.

20. The data storage device of claim 19, wherein the controller is configured to return the data on the first port in response to detecting the error rate increase.

\* \* \* \* \*